United States Patent [19]
Mori et al.

[11] Patent Number: 5,639,572
[45] Date of Patent: Jun. 17, 1997

[54] INTERCONNECTOR MATERIAL FOR ELECTROCHEMICAL CELLS

[75] Inventors: Kazutaka Mori; Hitoshi Miyamoto, both of Takasago; Tsuneaki Matsudaira, Kobe, all of Japan

[73] Assignee: Mitsubishi Jukogyo Kabushiki Kaisha, Tokyo, Japan

[21] Appl. No.: 514,102

[22] Filed: Aug. 11, 1995

[30]      Foreign Application Priority Data

Aug. 12, 1994  [JP]  Japan .................... 6-190489

[51] Int. Cl.$^6$ ............................ H01M 10/38
[52] U.S. Cl. .................. 429/123; 429/152; 429/158; 429/160; 429/161; 501/123; 501/135; 501/152
[58] Field of Search ................... 429/123, 27, 31, 429/38, 34, 66, 40, 152, 158, 160, 161; 501/123, 152, 135

[56]          References Cited

U.S. PATENT DOCUMENTS 5,389,456   2/1995   Singh et al. .................. 429/31

FOREIGN PATENT DOCUMENTS

| 0395400 | 10/1990 | European Pat. Off. . |
| 0562411 | 9/1993 | European Pat. Off. . |
| 2315151 | 1/1977 | France . |
| 5-178664 | 7/1993 | Japan . |
| 6-081062 | 3/1994 | Japan . |
| 6-219834 | 9/1994 | Japan . |
| 6-302326 | 10/1994 | Japan . |
| 7-130384 | 5/1995 | Japan . |

OTHER PUBLICATIONS

European Search Report dated Oct. 31, 1995.

*Primary Examiner*—Bruce F. Bell
*Attorney, Agent, or Firm*—Fish & Richardson PC

[57]          ABSTRACT

An interconnector material for use in electrochemical cells having $Y_2O_3$-stabilized $ZrO_2$ as a solid electrolyte, said interconnector material comprising a lanthanum chromite material of the following general formula:

$$(La_{1-x}Sr_x)(Cr_{1-y}M_y)O_3,$$

where M is Zr or Ti, x is in the range of 0.1 to 0.2, and y is in the range of 0.05 to 0.2.

7 Claims, 6 Drawing Sheets

INTERCONNECTOR MATERIAL FOR ELECTROCHEMICAL CELLS

BACKGROUND OF THE INVENTION

1. Field of the Invention

This invention relates to a lanthanum chromite material which can be advantageously used as an interconnector material in electrochemical cells such as solid-oxide fuel cells and solid-electrolyte steam electrolyzers.

2. Description of the Related Art

For example, in solid-oxide fuel cells (hereinafter abbreviated as SOFCs) or solid-electrolyte fuel cells, interconnectors are used as connecting members for combining a plurality of single cells to raise the total voltage and thereby obtain high electric power. Such interconnectors function not only to provide electrical connection, but also to separate the oxidizing gas (air) from the reducing gas (fuel) at elevated temperatures. Accordingly, refractory metals having a high melting point and perovskite type oxides, such as lanthanum chromite doped with Mg, Ca or Sr, have been used as interconnector materials.

Since the operating temperature of SOFCs is as high as 1,000° C. or so, even high-melting metals form an oxide during long-term use in an oxidizing atmosphere. This is undesirable in that their surfaces come to have electrical insulating properties and thus exhibit poor electric conduction.

On the other hand, lanthanum chromite which is an oxide is stable in an oxidizing atmosphere, but has the disadvantage that its electric conductivity is low and some characteristics thereof, such as electric conductivity, change as a result of reduction in a reducing atmosphere. For this reason, lanthanum chromite has been doped with an alkaline earth metal, such as Mg, Ca or Sr, in order to enhance its electric conductivity. When lanthanum chromite is doped with Mg, Ca or Sr, its electric conductivity becomes higher in the Order mentioned.

Moreover, since an SOFC is an assembly consisting of a solid electrolyte [i.e., YSZ ($Y_2O_3$-stabilized $ZrO_2$ or yttria-stabilized zirconia)], electrodes, such as oxygen electrodes and fuel electrodes, and interconnectors, the coefficient of thermal expansion of the interconnectors needs to match with that of YSZ, which forms a base. From this point of view, lanthanum chromite doped with Sr has a coefficient of thermal expansion of the order of $10° \times 10^{-6°}$ C.$^{-1}$ which is almost equal to that of the solid electrolyte YSZ. Accordingly, lanthanum chromite doped with Sr which has a high electric conductivity and a coefficient of thermal expansion almost equal to that of the solid electrolyte YSZ has been used as an interconnector material for SOFCs.

Observing the behavior of lanthanum chromite doped with Sr in a reducing atmosphere, however, it has been found that a relatively high degree of expansion is caused by reduction. This is presumed to be responsible for deformation and cracking of the interconnectors, and delamination of the electrodes.

SUMMARY OF THE INVENTION

In view of the above-described technical level, an object of the present invention is to provide an interconnector material comprising a lanthanum chromite material which shows low reductive expansion, a high electric conductivity, and a coefficient of thermal expansion close to that of YSZ (i.e., $10.2° \times 10^{-6°}$ C.$^{-1}$).

The present invention provides an interconnector material for use in electrochemical cells having $Y_2O_3$-stabilized $ZrO_2$ as a solid electrolyte, comprising a lanthanum chromite material of the following general formula:

$$(La_{1-x}Sr_x)(Cr_{1-y}M_y)O_3,$$

where M is Zr or Ti, x is in the range of 0.1 to 0.1, and y is in the range of 0.05 to 0.2.

According to the present invention, lanthanum chromite ($LaCrO_3$) is modified by replacing a portion of La by Sr and further replacing a portion of Cr by Zr or Ti. The resulting lanthanum chromite materials can prevent expansion in a high-temperature reducing atmosphere while retaining a high electric conductivity and a high coefficient of thermal expansion, and are hence useful as interconnector materials. Specifically, in the present invention, Sr is used as a doping element for lanthanum chromite, and zirconia or titania is further added thereto. As a result, there can be obtained a material having a high electric conductivity, a coefficient of thermal expansion of around $10° \times 10^{-6°}$ C.$^{31\ 1}$, which is relatively high for ceramics, and a very low amount of expansion of about 0.1% or less as caused by the release of oxygen in a high-temperature reducing atmosphere.

In order to prevent the expansion of a lanthanum chromite material during reduction while maintaining its coefficient of thermal expansion at the same level as that of YSZ and without reducing its electric conductivity appreciably, the present invention involves adding zirconia or titania to lanthanum chromite in which a portion of La has been replaced by Sr as a solute element. This stabilizes the trivalent chromium and thereby makes it possible to minimize its expansion upon reduction.

For example, when 15% of La in lanthanum chromite of the formula $LaCrO_3$ is replaced by Sr, its electric conductivity at 1,000° C. is as high as 30 S·cm$^{-1}$. Moreover, the coefficient of thermal expansion of this material is of the order of $10° \times 10^{-6°}$ C.$^{-1}$ and almost equal to that of YSZ forming the main component of SOFCs. However, this material exhibits a high degree of expansion during reduction and its use has been limited thereby. According to the present invention, the requirements of interconnectors for use in SOFCs (i.e., a coefficient of thermal expansion almost equal to that of YSZ, a high electric conductivity, and the minimization of expansion during by reduction) can be met by further replacing a portion of Cr by Zr or Ti.

The interconnector material of the present invention has a composition represented by the following general formula: $(La_{1-x}Sr_x)(Cr_{1-y}M_y)O_3$, where M is Zr or Ti, x is in the range of 0.1 to 0.2, and y is in the range of 0.05 to 0.2. These ranges of the x and y values have been determined so as to give a value of reductive expansion of not greater than 0.13% which is within acceptable limits for the deformation and cracking of interconnectors, an electric conductivity of not less than 10 S·cm$^{-1}$ which is suitable for the practical use as interconnectors, and a coefficient of thermal expansion of 9 to $10.5° \times 10^{-6°}$ C.$^{-1}$ which is close to that of YSZ.

DETAILED DESCRIPTION OF THE PREFERRED EMBODIMENTS

In order to clarify the effects of the present invention, the following examples are given.

EXAMPLE 1

A series of oxides having a composition represented by the following general formula were experimentally prepared: $(La_{1-x}Sr_x)(Cr_{1-y}Zr_y)O_3$, where x is in the range of 0 to 0.5 and y is in the range of 0 to 0.4.

Lanthanum oxide, strontium carbonate, chromium oxide, and zirconium oxide, which were used as starting powders, were mixed according to several formulations. Each of mixtures was blended in a ball mill and then heat-treated at 1,300° C. for 10 hours to obtain a compound oxide powder. Then, the compound oxide powder was uniaxially pressed at 100 kg/cm² to obtain a disk having a diameter of about 60 mm and a thickness of about 5 mm, which was subjected to CIP (cold isostastical press) at 2,000 kg/cm². The resulting compact was sintered at a temperature of 1,500°–1,700° C. to obtain a sintered compact. From the several discoid sintered compacts thus obtained, 3×4×40 mm test pieces were prepared and used as samples for the measurement of some physical properties. These physical properties were measured according to the following procedures.

[Reductive expansion]

Each test piece was maintained in an atmosphere of hydrogen at 1,000° C. for 5 hours. After cooling, its change in length was measured.

[Electric conductivity]

Four platinum lead wires were wound around each test piece with the space of about 10 mm between adjacent lead wires. Then, its electric conductivity was measured at various temperatures according to the direct-current four-terminal method.

[Coefficient of thermal expansion]

While the temperature of each test piece was raised at a rate of 10° C./min, its thermal expansion was measured continuously.

Figure 1:
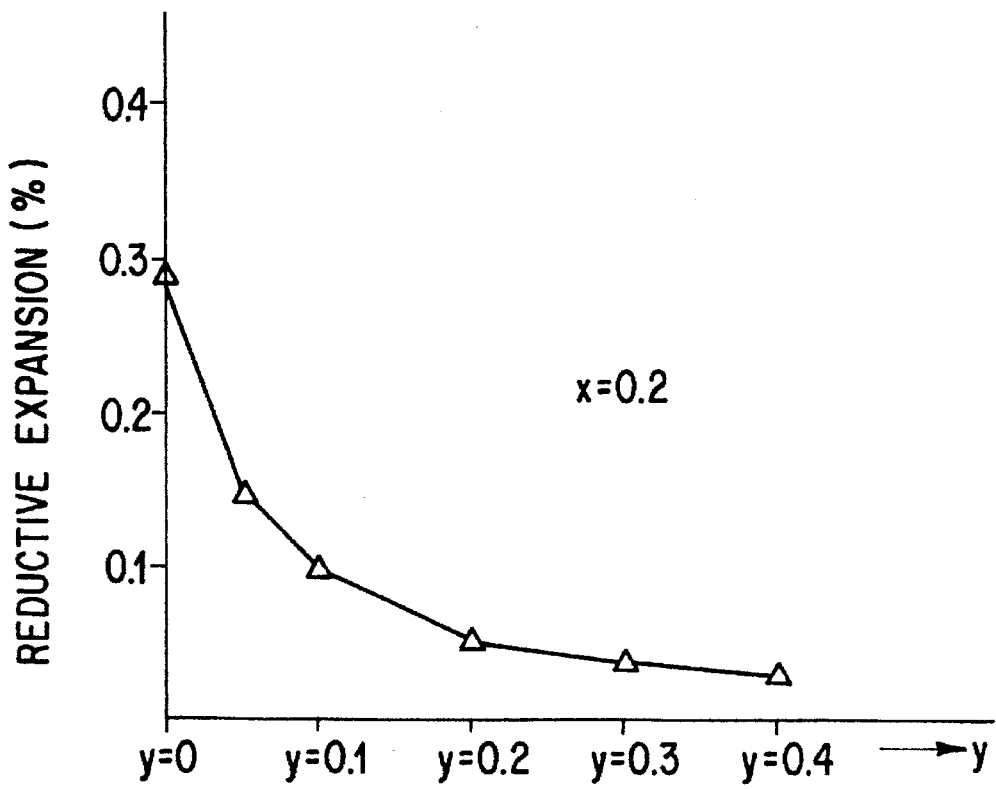
FIG. 1 is a graph showing changes in the reductive expansion of the $(La_{1-x}Sr_x)(Cr_{1-y}Zr_y)O_3$ material of the present invention when x was fixed at 0.2 and y was varied.

FIG. 1 shows data on the reductive expansion. The abscissa indicates the value of y in the above general formula and the ordinate the reductive expansion (%). In this case, the value of x in the above general formula was fixed at 0.2.

When y=0, the reductive expansion is as high as 0.3%. Even if x=0.2, as the value of y is increased from 0, the reductive expansion becomes lower.

Figure 2:
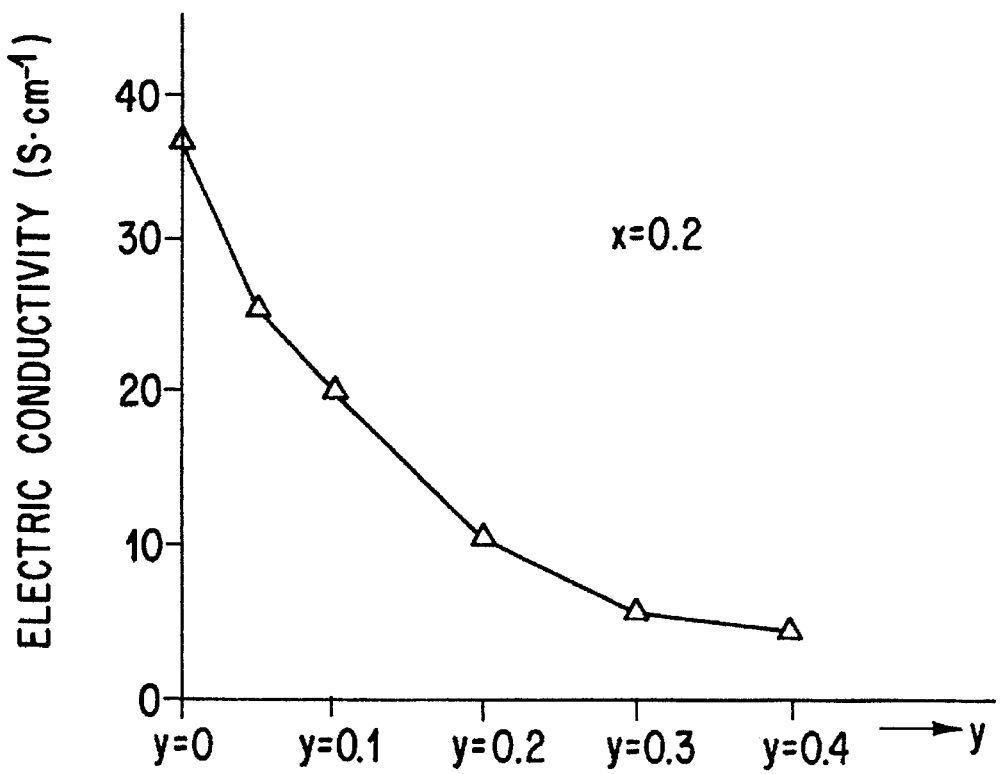
FIG. 2 is a graph showing changes in the electric conductivity of the $(La_{1-x}Sr_x)(Cr_{1-y}Zr_y)O_3$ material of the present invention when x was fixed at 0.2 and y was varied.

FIG. 2 shows data on the electric conductivity at 1,000° C. The abscissa indicates the value of y in the above general formula and the ordinate the electric conductivity (S·cm⁻¹). Also in this case, the value of x in the above general formula was fixed at 0.2.

When y=0, the electric conductivity is as high as 37 S·cm⁻¹. However the electric conductivity becomes lower as the value of y is increased from 0.

Figure 3:
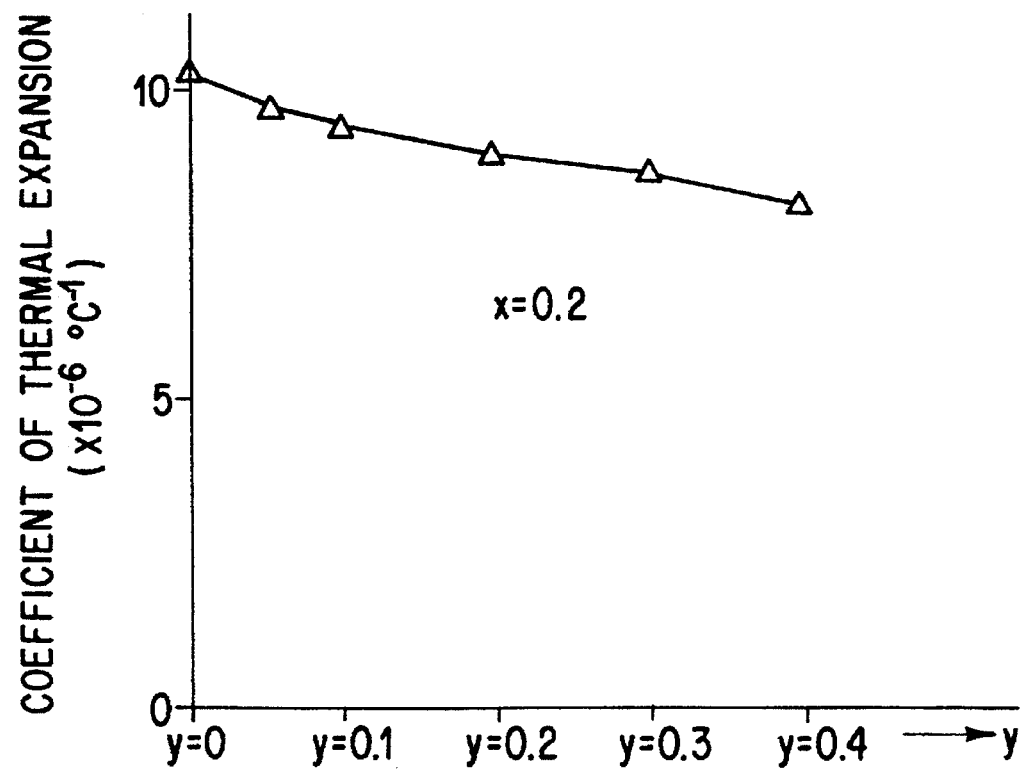
FIG. 3 is a graph showing changes in the coefficient of thermal expansion of the $(La_{1-x}Sr_x)(Cr_{1-y}Zr_y)O_3$ material of the present invention when x was fixed at 0.2 and y was varied.

FIG. 3 shows data on the coefficient of thermal expansion. The abscissa indicates the value of y in the above general formula and the ordinate the coefficient of thermal expansion (x 10⁻⁶° C.⁻¹). Also in this case, the value of x in the above general formula was fixed at 0.2.

When y=0, the coefficient of thermal expansion is $10.3° \times 10^{-6°}$ C.⁻¹ and almost equal to that of YSZ (i.e., $10.3° \times 10^{-6°}$ C.⁻¹). However, the coefficient of thermal expansion becomes lower as the value of y is increased.

The above-described results have revealed that, when the value of y (i.e., the proportion of Cr which is replaced by Zr) is increased, the reductive expansion becomes lower, but the electric conductivity and the coefficient of thermal expansion also become lower.

Figure 4:
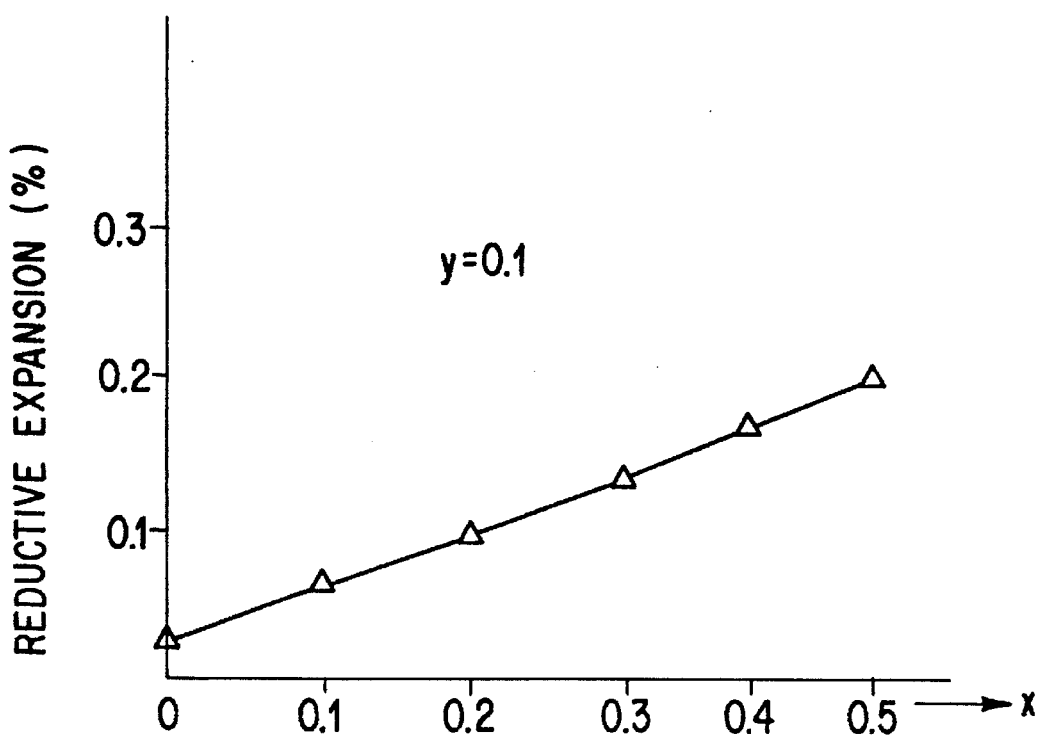
FIG. 4 is a graph showing changes in the reductive expansion of the $(La_{1-x}Sr_x)(Cr_{1-y}Zr_y)O_3$ material of the present invention when y was fixed at 0.1 and x was varied.

FIG. 4 shows data on the reductive expansion. The abscissa indicates the value of x in the above general formula and the ordinate the reductive expansion (%). In this case, the value of y in the above general formula was fixed at 0.1.

When y=0.1, the reductive expansion becomes higher as the value of x is increased.

Figure 5:
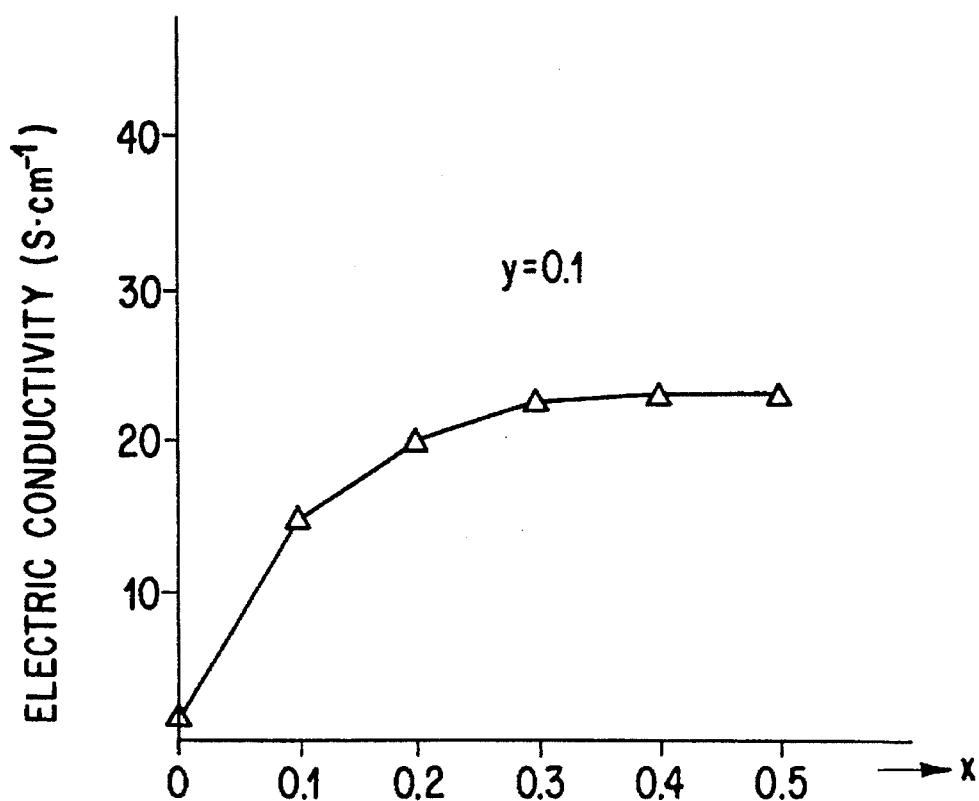
FIG. 5 is a graph showing changes in the electric conductivity of the $(La_{1-x}Sr_x)(Cr_{1-y}Zr_y)O_3$ material of the present invention when y was fixed at 0.1 and x was varied.

FIG. 5 shows data on the electric conductivity at 1,000° C. The abscissa indicates the value of x in the above general formula and the ordinate the electric conductivity (S·cm⁻¹). Also in this case, the value of y in the above general formula was fixed at 0.1.

When x=0, the electric conductivity is as low as 1 S·cm⁻¹. However, the electric conductivity becomes higher as the value of x is increased.

Figure 6:
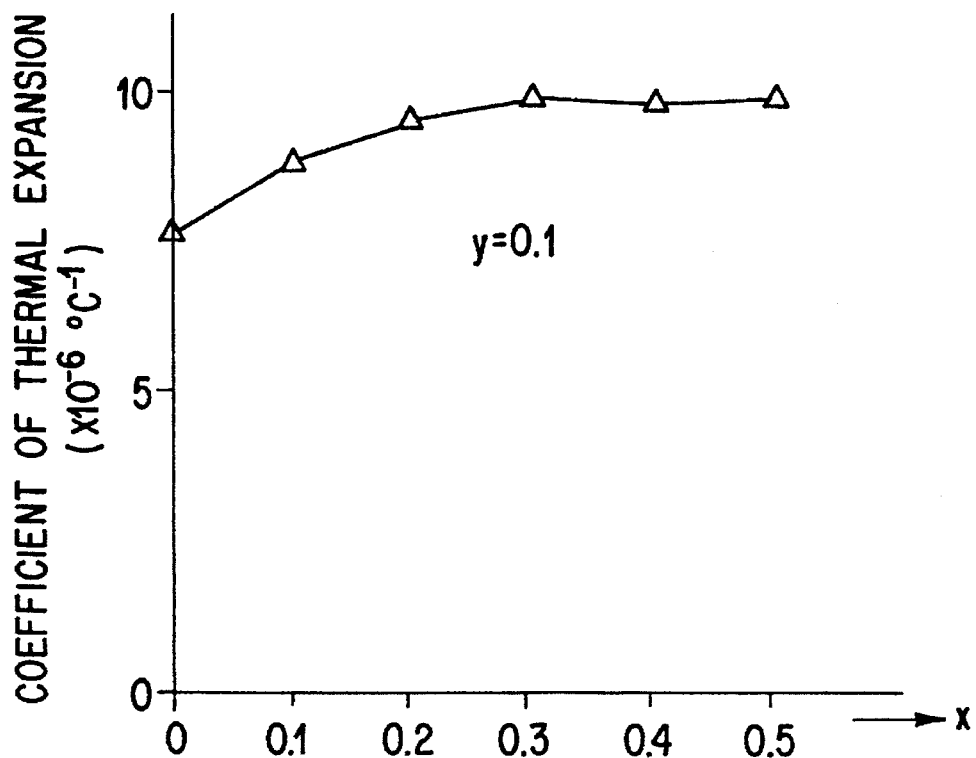
FIG. 6 is a graph showing changes in the coefficient of thermal expansion of the $(La_{1-x}Sr_x)(Cr_{1-y}Zr_y)O_3$ material of the present invention when y was fixed at 0.1 and x was varied.

FIG. 6 shows data on the coefficient of thermal expansion. The abscissa indicates the value of x in the above general formula and the ordinate the coefficient of thermal expansion (x 10⁻⁶° C.⁻¹). Also in this case, the value of y in the above general formula was fixed at 0.1.

When x=0, the coefficient of thermal expansion is $7.5 \times 10^{-6°}$ C.⁻¹ and significantly lower than that of YSZ (i.e., $10.3° \times 10^{-6°}$ C.⁻¹). However, the coefficient of thermal expansion becomes higher as the value of x is increased.

The above-described results have revealed that, when the value of x (i.e., the proportion of La which is replaced by Sr) is increased, the reductive expansion becomes higher, but the electric conductivity and the coefficient of thermal expansion also become higher.

Where the $(La_{1-x}Sr_x)(Cr_{1-y}Zr_y)O_3$ material is to be used in SOFCs and the like, it is necessary that its coefficient of thermal expansion be almost equal to that of the solid electrolyte YSZ and, at the same time, it have a high electric conductivity and shows low reductive expansion. As a result, it has been concluded that the value of x should preferably be in the range of 0.1 to 0.2 and the value of y in the range of 0.05 to 0.2.

EXAMPLE 2

A series of oxides having a composition represented by the following general formula were experimentally prepared: $(La_{1-x}Sr_x)(Cr_{1-y}Ti_y)O_3$, where x has a value in the range of 0 to 0.5 and y has a value in the range of 0 to 0.4.

Lanthanum oxide, strontium carbonate, chromium oxide and titanium oxide, which were used as starting powders, were mixed according to several formulations. Each of mixtures was blended in a ball mill and then heat-treated at 1,300° C. for 10 hours to obtain a compound oxide powder. Then, the compound oxide powder was uniaxially pressed at 100 kg/cm² to obtain a disk having a diameter of about 60 mm and a thickness of about 5 mm, which was subjected to CIP treatment at 2,000 kg/cm². The resulting compact was sintered at a temperature of 1,500°–1,700° C. to obtain a sintered compact. From the several discoid sintered compacts thus obtained, 3×4×40 mm test pieces were prepared and used as samples for the measurement of some physical properties. These physical properties, such as the reductive expansion, electric conductivity, and coefficient of thermal conductivity, were measured in the same manner as in Example 1.

Figure 7:
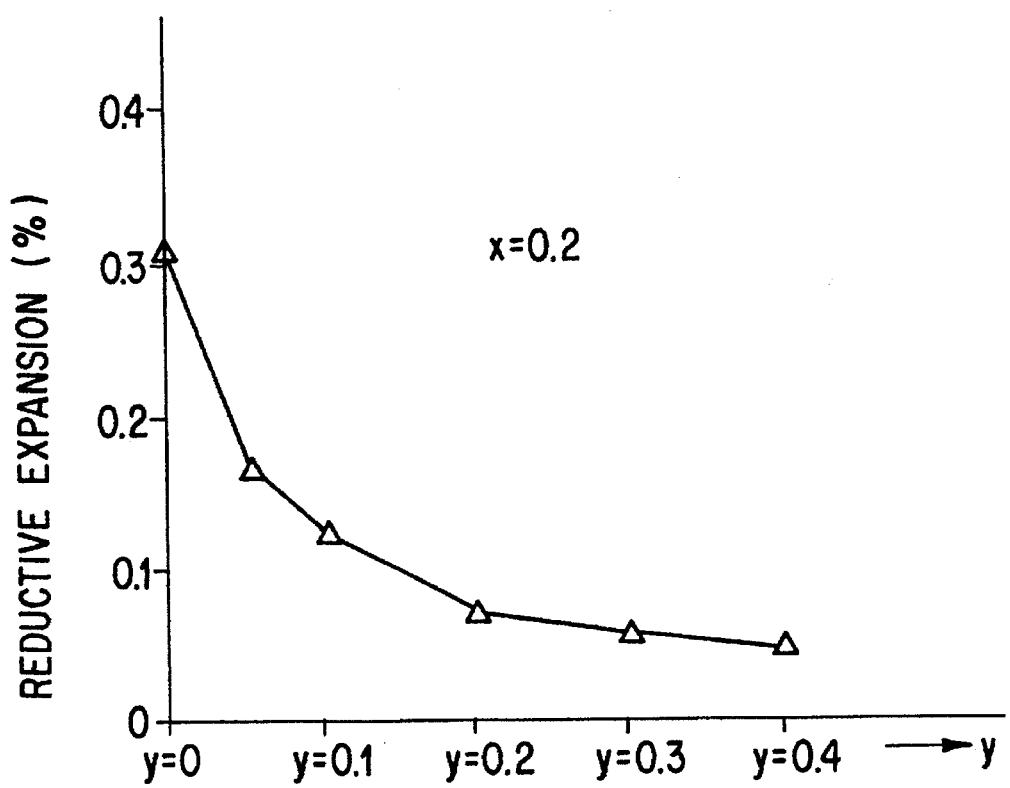
FIG. 7 is a graph showing changes in the reductive expansion of the $(La_{1-x}Sr_x)(Cr_{1-y}Ti_y)O_3$ material of the present invention when x was fixed at 0.2 and y was varied.

FIG. 7 shows data on the reductive expansion. The abscissa indicates the value of y in the above general formula and the ordinate the reductive expansion (%). In this case, the value of x in the above general formula was fixed at 0.2.

When y=0, the reductive expansion is as high as 0.3%. Even if x=0.2, as the value of y is increased from 0, the reductive expansion becomes lower.

Figure 8:
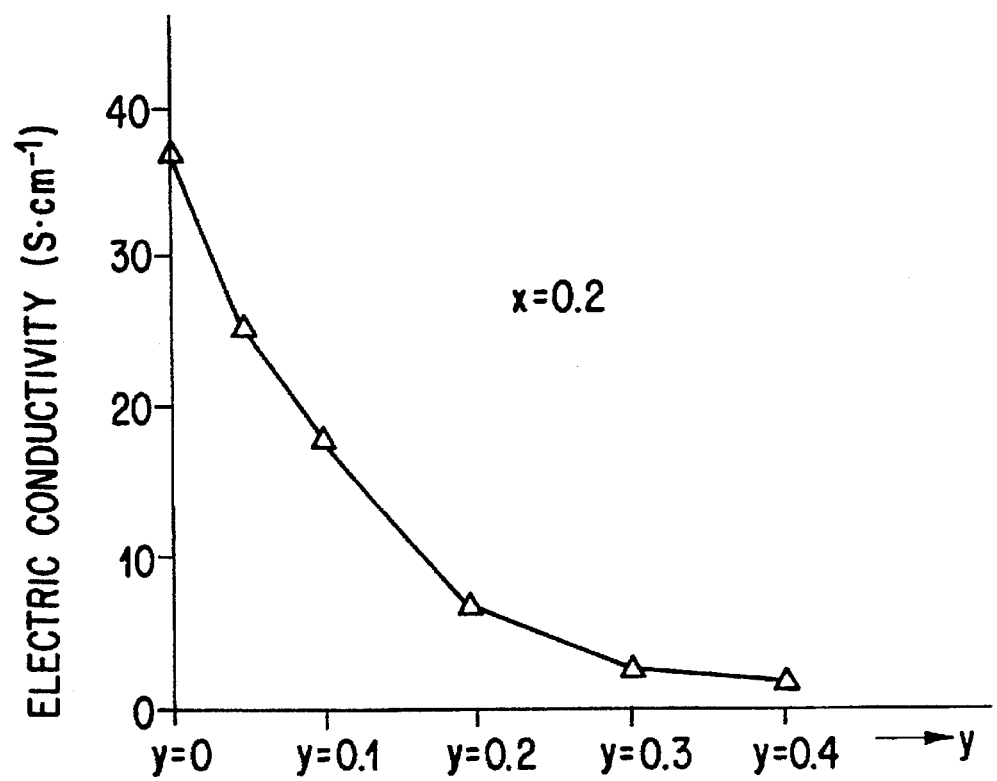
FIG. 8 is a graph showing changes in the electric conductivity of the $(La_{1-x}Sr_x)(Cr_{1-y}Ti_y)O_3$ material of the present invention when x was fixed at 0.2 and y was varied.

FIG. 8 shows data on the electric conductivity at 1,000° C. The abscissa indicates the value of y in the above general formula and the ordinate the electric conductivity (S·cm⁻¹). Also in this case, the value of x in the above general formula was fixed at 0.2.

When y=0, the electric conductivity is as high as 37 S·cm⁻¹. However the electric conductivity becomes lower as the value of y is increased from 0.

Figure 9:
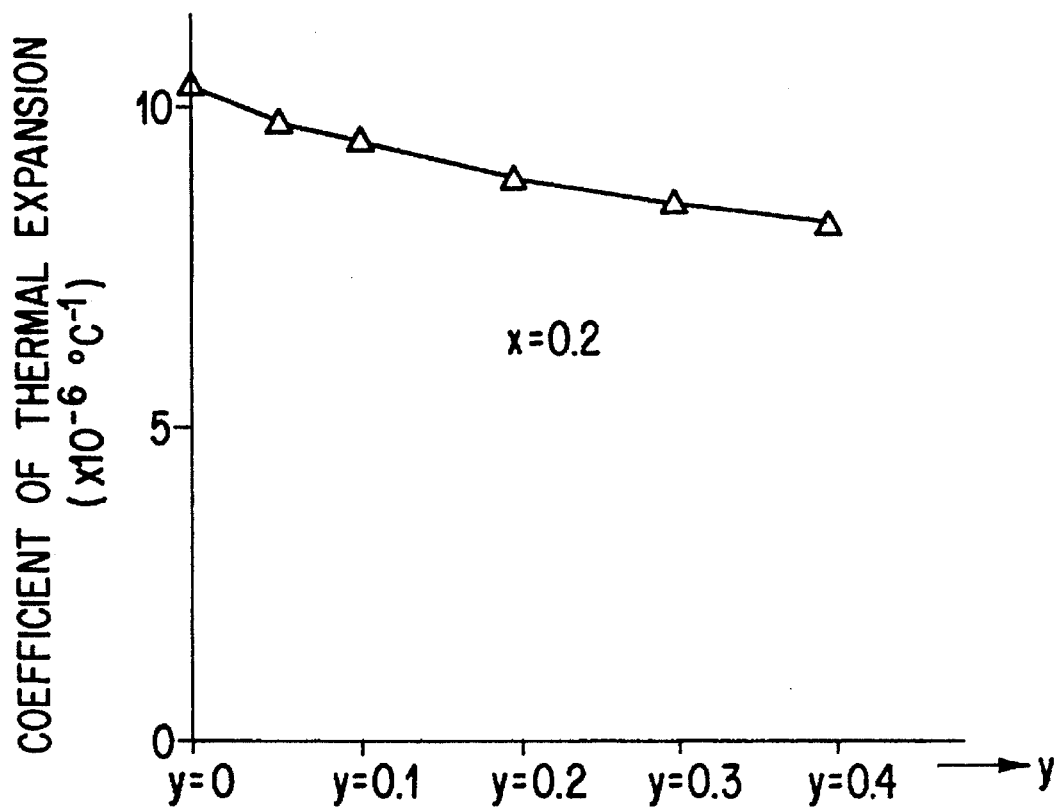
FIG. 9 is a graph showing changes in the coefficient of thermal expansion of the $(La_{1-x}Sr_x)(Cr_{1-y}Ti_y)O_3$ material of the present invention when x was fixed at 0.2 and y was varied.

FIG. 9 shows data on the coefficient of thermal expansion. The abscissa indicates the value of y in the above general formula and the ordinate the coefficient of thermal expansion (x $10^{-6}$° C.⁻¹). Also in this case, the value of x in the above general formula was fixed at 0.2.

When y=0, the coefficient of thermal expansion is 10.3°× $10^{-6}$° C.⁻¹ and almost equal to that of YSZ (i.e., 10.3°×$10^{-6}$° C.⁻¹). However, the coefficient of thermal expansion becomes lower as the value of y is increased.

The above-described results have revealed that, when the value of y (i.e., the proportion of Cr which is replaced by Zr) is increased, the reductive expansion becomes lower, but the electric conductivity and the coefficient of thermal expansion also become lower.

Figure 10:
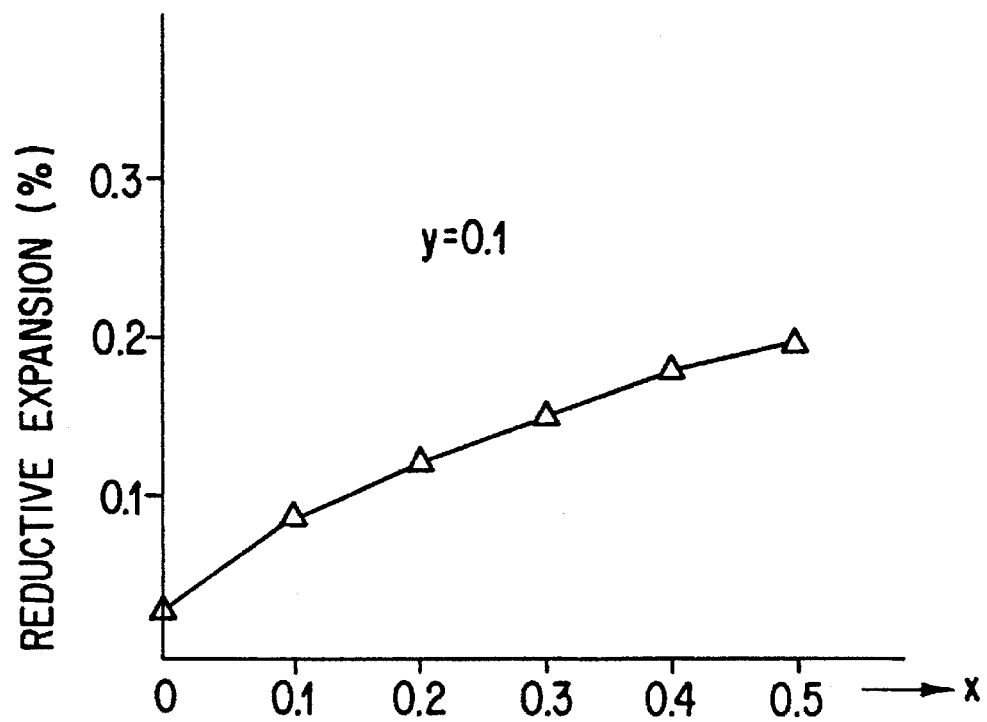
FIG. 10 is a graph showing changes in the reductive expansion of the $(La_{1-x}Sr_x)(Cr_{1-y}Ti_y)O_3$ material of the present invention when y was fixed at 0.1 and x was varied.

FIG. 10 shows data on the reductive expansion. The abscissa indicates the value of x in the above general formula and the ordinate the reductive expansion (%). In this case, the value of y in the above general formula was fixed at 0.1.

When y=0.1, the reductive expansion becomes higher as the value of x is increased.

Figure 11:
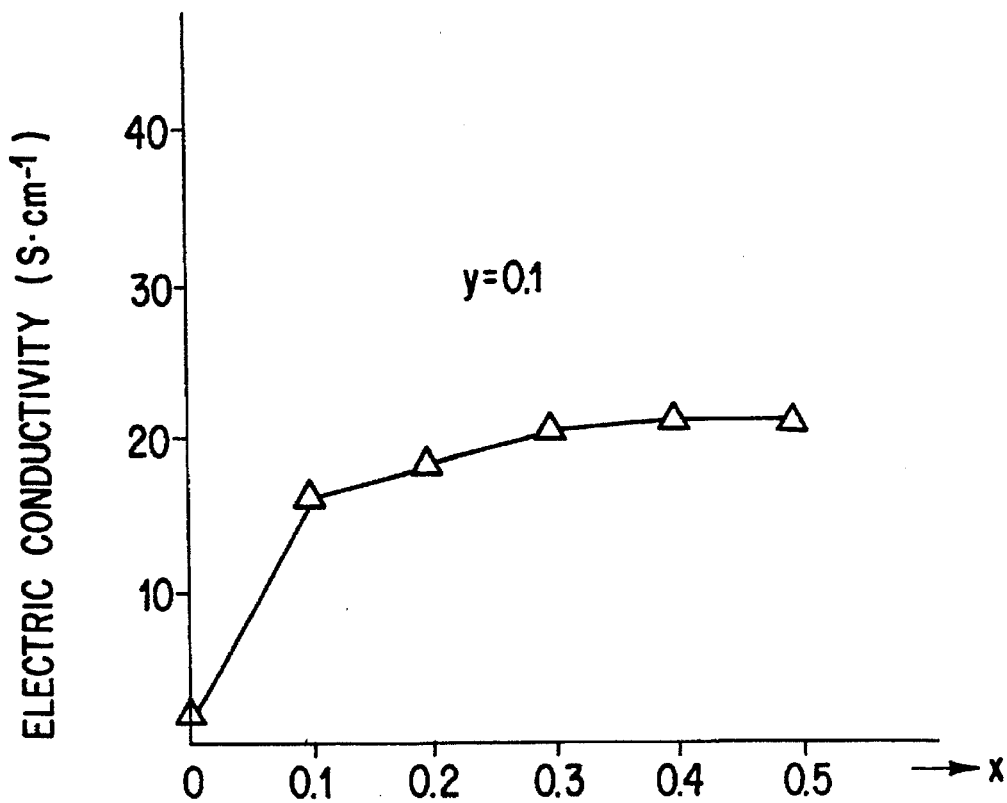
FIG. 11 is a graph showing changes in the electric conductivity of the $(La_{1-x}Sr_x)(Cr_{1-y}Ti_y)O_3$ material of the present invention when y was fixed at 0.1 and x was varied.

FIG. 11 shows data on the electric conductivity at 1,000° C. The abscissa indicates the value of x in the above general formula and the ordinate the electric conductivity (S·cm⁻¹). Also in this case, the value of y in the above general formula was fixed at 0.1.

When x=0, the electric conductivity is as low as 1 S·cm⁻¹. However, the electric conductivity becomes higher as the value of x is increased.

Figure 12:
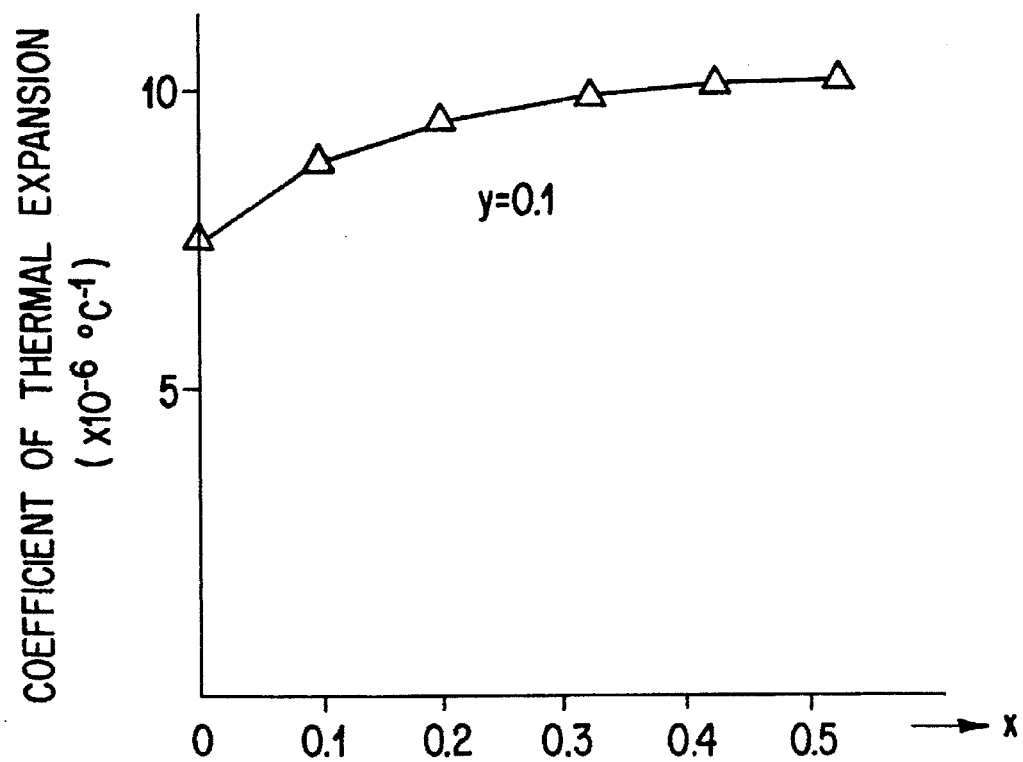
FIG. 12 is a graph showing changes in the coefficient of thermal expansion of the $(La_{1-x}Sr_x)(Cr_{1-y}Ti_y)O_3$ material of the present invention when y was fixed at 0.1 and x was varied.

FIG. 12 shows data on the coefficient of thermal expansion. The abscissa indicates the value of x in the above general formula and the ordinate the coefficient of thermal expansion (x $10^{-6}$° C.⁻¹). Also in this case, the value of y in the above general formula was fixed at 0.1.

When x=0, the coefficient of thermal expansion is 7.5°× $10^{-6}$° C.⁻¹ and significantly lower than that of YSZ (i.e., 10.3°×$10^{-6}$° C.⁻¹). However, the coefficient of thermal expansion becomes higher as the value of x is increased.

The above-described results have revealed that, when the value of x, i.e., the proportion of La which is replaced by Sr, is increased, the reductive expansion becomes greater, but the electric conductivity and the coefficient of thermal expansion also become higher.

Where the $(La_{1-x}Sr_x)(Cr_{1-y}Ti_y)O_3$ material is to be used in SOFCs and the like, it is necessary that its coefficient of thermal expansion be almost equal to that of the solid electrolyte YSZ and, at the same time, it have a high electric conductivity and shows low reductive expansion. As a result, it has been concluded that the value of x should preferably be in the range of 0.1 to 0.2 and the value of y in the range of 0.05 to 0.2.

We claim:

1. An interconnector material for use in electrochemical cells having $Y_2O_3$-stabilized $ZrO_2$ as a solid electrolyte, said interconnector material comprising a lanthanum chromite material having a general formula:

$$(La_{1-x}Sr_x)(Cr_{1-y}M_y)O_3,$$

where M is Zr or Ti, x is in a range of 0.1 to 0.2, and y is in a range of 0.05 to 0.2.

2. The interconnector material claimed in claim 1, a thermal expansion coefficient of which is approximately equal to that of yttria-stabilized zirconia used as a solid electrolyte in an electrochemical cell.

3. The interconnector material claimed in claim 1, a reductive expansion of which is about 0.1% or less.

4. The interconnector material claimed in claim 1, wherein x is between 0.15 and 0.2, and y is between 0.1 and 0.15.

5. An electrochemical cell comprising:
    a solid electrolyte comprising $Y_2O_3$-stabilized $ZrO_2$;
    at least one electrode; and
    interconnectors comprising the material according to claim 1.

6. In an electrochemical cell including a solid electrolyte and interconnectors wherein the improvement comprises the use of the interconnector material according to claim 1.

7. The electrochemical cell according to claim 6 wherein the solid electrolyte comprises $Y_2O_3$-stabilized $ZrO_2$.

* * * * *